(12) United States Patent
Linke

(10) Patent No.: US 7,298,111 B2
(45) Date of Patent: Nov. 20, 2007

(54) METHOD AND DEVICE FOR CONTROLLING A PRODUCTION UNIT

(75) Inventor: Wolfgang Linke, Berlin (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 0 days.

(21) Appl. No.: 10/554,055

(22) PCT Filed: Feb. 25, 2004

(86) PCT No.: PCT/EP2004/001834

§ 371 (c)(1),
(2), (4) Date: Oct. 24, 2005

(87) PCT Pub. No.: WO2004/097538

PCT Pub. Date: Nov. 11, 2004

(65) Prior Publication Data
US 2006/0267536 A1 Nov. 30, 2006

(30) Foreign Application Priority Data
Apr. 25, 2003 (DE) .................. 103 19 064

(51) Int. Cl.
*G05B 11/32* (2006.01)

(52) U.S. Cl. ................ 318/625; 318/47; 318/34; 318/51; 318/632; 318/563

(58) Field of Classification Search .......... 318/625, 318/47, 34, 51, 700, 705, 715, 434, 85, 632, 318/563, 567, 569, 611, 615, 675; 364/176
See application file for complete search history.

(56) References Cited

U.S. PATENT DOCUMENTS

| 4,000,449 A | 12/1976 | Gripp |
| 4,554,774 A | 11/1985 | Miyashita |
| 5,175,680 A * | 12/1992 | Yoneda et al. ................ 700/71 |
| 6,536,572 B2 * | 3/2003 | Amanuma et al. ....... 192/53.32 |

FOREIGN PATENT DOCUMENTS

DE 36 14979 A1 11/1987

(Continued)

OTHER PUBLICATIONS

Lorenz R.D. et al "Synchronized motion control for process automation" Conference Record of the Industry Applications Society Annual Meeting, Oct. 1, 1989, pp. 1693-1698, XP010091171, New York, US, p. 1695, left-hand column, lines 1-6.

*Primary Examiner*—Karen Masih
(74) *Attorney, Agent, or Firm*—Sughrue Mion Pllc.

(57) ABSTRACT

A method and a device for controlling a production unit in a production installation are specified, controlling referring to the controlling and monitoring of speeds of rotation or angles of rotation of individual drives (20-22) such that the movements of these are monitored in respect of a synchronous value (37) and/or a limit value (33). The monitoring in respect of the limit value (33) results in a safely limited speed of the individual drives. The monitoring in respect of the synchronous value (37) permits detection of asynchronies. The monitoring can be carried out in normal operating mode and/or in setup mode, and, in setup mode, it serves particularly to protect the operating personnel from drives (20-22) that start up suddenly or are running too fast.

21 Claims, 3 Drawing Sheets

FOREIGN PATENT DOCUMENTS

| | | |
|---|---|---|
| DE | 39 37 536 A1 | 5/1990 |
| DE | 43 07 839 A1 | 9/1994 |
| DE | 195 22 447 A1 | 1/1997 |
| EP | 243 728 A2 | 11/1987 |
| EP | 385459 A2 | 9/1990 |
| EP | 436 209 A2 | 7/1991 |

* cited by examiner

METHOD AND DEVICE FOR CONTROLLING A PRODUCTION UNIT

BACKGROUND OF THE INVENTION

The present invention relates to a method and a device for controlling a production unit of a production installation. Said production installation is, in particular, a production and packaging installation, preferably one for cigarettes or other articles for smoking. Such an installation comprises a number of different production units, which however are combined with one another in the production and packaging process, for example a cigarette production machine (maker), a packaging machine (packer), a film-wrapping machine, and, if appropriate, a multipacker and a carton packer. The speeds within the individual production units are coordinated in respect of a speed of a central drive of the respective production unit, also referred to as master drive or master shaft. The speeds of all other drives (slave drives) of the production unit are derived from the speed of the master shaft.

For servicing, it is necessary to gain access into the production installation or into an individual production unit. During such access, the installation or the production unit is in principle shut down. However, it may be necessary that the installation or production unit, hereinafter referred to jointly as installation, is started up again at a controlled speed during the service work, for example to permit access also to otherwise concealed sections of individual units, for example a section of a revolver in the area of the film-wrapping machine. This has hitherto been achieved by the installation or a central part of the installation being covered by a protective arrangement, for example in the form of a hood. To gain access into the installation, the hood has to be opened. When the hood is opened, the installation shuts down. The master shaft can now be turned further using a handwheel. The speed of rotation thus set for the master shaft influences the speeds of rotation of the dependent drives. Even with a comparatively low speed of rotation of the master shaft, it is possible for there to be a high speed of rotation of individual dependent drives. For this reason, all the dependent drives are safeguarded by in each case a further hood, as it were a "hood within a hood". When a hood of a dependent drive is opened, further movement of the master shaft is blocked.

SUMMARY OF THE INVENTION

The object of the invention is to make available a simple and safe method for controlling a production unit and also a device for carrying out this method. In particular, in the event of servicing, access into the installation must be possible while maintaining the possibility of moving the central drive and dependent drives.

The object is achieved by the claimed method and by the claimed device. Accordingly, provision is made for the monitoring of limit values, namely limit values concerning speed or position, for example limit speeds or synchronous rotation positions.

The monitoring of the limit speeds is useful when generating desired speed values (desired speeds) for the individual drives. Moreover, the speed actually achieved can be monitored in respect of a limit speed (safely limited speed). The speed actually achieved for the individual drives can furthermore be monitored in respect of the respective desired speed, because synchrony of the individual drives with one another and with the central drive is guaranteed only if the desired speed is maintained exactly (synchronous speed).

The monitoring of the synchronous rotation positions is in principle analogous to the monitoring of the limit speeds or synchronous speeds, the only difference being that the positions of rotation of the respective drives, that is to say the angle positions, are monitored instead of the speeds of rotation. This is expedient for dependent drives which, for example, do not execute a complete revolution but instead execute oscillating movements or the like. Even in the case of dependent drives that execute complete revolutions, the monitoring of the position of rotation and the comparison of the respective position of rotation with the position of rotation of the central drive permit the best possibility of monitoring the synchrony of the movement of the respective dependent drive with the corresponding movement of the central drive. The actually achieved position of the individual drives can moreover be monitored in respect of a limit value functionally corresponding to the limit speed in the speed monitoring. Such a limit value sets a tolerance range in the environment of the respective desired position, because an exact synchrony of position is often not possible to attain in practice. The tolerance range set by the limit value can be adapted by changing the limit value, that is to say made smaller or larger. Because of the theoretical analogy of a limit value in the form of a limit speed and a limit value in the form of a position-related tolerance range, both are referred to hereinafter simply as limit value.

A particular feature of the method according to the invention is that, in the event of access being made into the installation, which access is detected through opening of a protective arrangement, for example a hood or the like, a related signal (hood signal) is generated and this signal is used to reduce the speed of rotation, in particular the speed of rotation of the central drive, so that the drives automatically run more slowly in the event of such access being made. By reducing the speed of rotation of the central drive, a corresponding reduction in the speeds of rotation of the dependent drives is automatically obtained. This modified pattern of movement can additionally be monitored by means of the respective limit values also being correspondingly reduced. Reducing the limit value for the central drive ensures that, if for any reason a speed above the respective desired speed is reached, the central drive is stopped or switched off, at least when the speed set by the limit value is reached. In the case of the dependent drives, a corresponding reduction of the limit values has the effect that, if the respective set desired speed is exceeded, these drives also only reach at most a speed set by the limit value. This thus ensures safe limiting of the speed, so that sufficient safety of the operating personnel is guaranteed.

Another particular feature of the invention is that speed information concerning a speed of rotation or angle of rotation of the central drive (speed of rotation or angle of rotation of master shaft) is evaluated such that, at a master shaft speed of rotation with the value zero, the limit value for the drives, in particular the limit value for the dependent drives, is likewise set to zero or kept at zero. This ensures that dependent drives do not incorrectly start running (i.e. they are safely stopped) and thus increases the safety of the operating personnel.

Finally, one particular feature of the invention is that the safely limited speed thus achieved is also guaranteed in the normal operating mode of the installation. In this way it is possible to avoid asynchronies of the dependent drives with one another or in relation to the master drive even in the normal operating mode.

BRIEF DESCRIPTION OF THE DRAWINGS

Further particular features of the invention are explained in more detail below with reference to the drawings, in which.

DETAILED DESCRIPTION OF THE PREFERRED EMBODIMENTS

Figure 1:
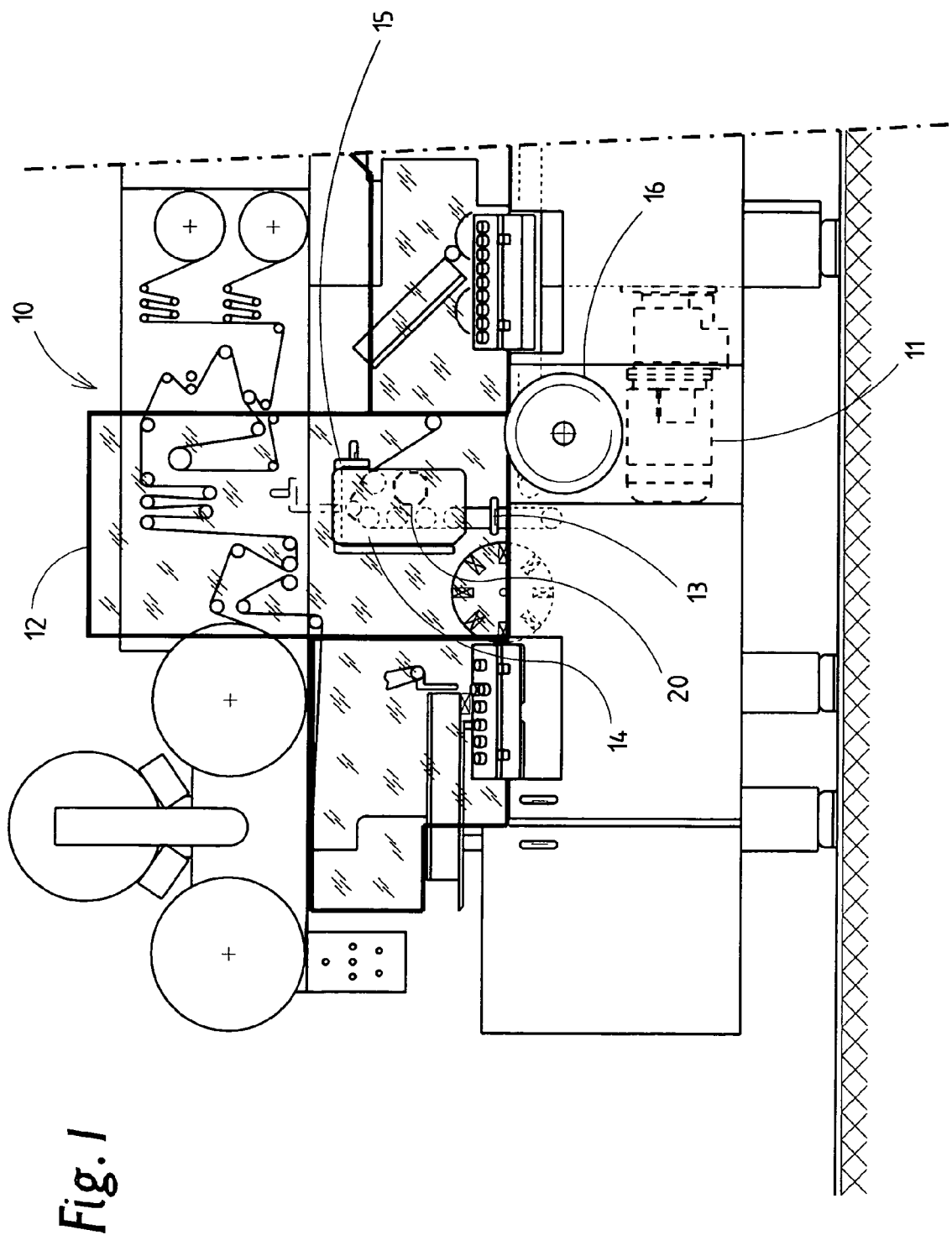
FIG. 1 shows a schematic representation of a production installation.

The illustrative embodiment shown in the drawings relates to a production and packaging installation for cigarettes as production installation. This usually comprises a number of production units, for example a cigarette-production machine, namely a maker, a packaging machine following the latter, that is to say a packer, a subsequent film-wrapping machine 10, a packaging machine for producing multipacks from a plurality of cigarette packs, that is to say a multipacker and a cartoner which packages multipacks, that is to say cigarette multipacks, in a shipping carton. Cigarettes produced by the maker are fed to the packer which is provided for producing hinge-lid boxes for receiving the cigarettes. The cigarette packs formed by the packer, that is to say the combination of hinge-lid box and the cigarettes contained in them, are delivered to the film-wrapping machine 10. The latter has the task of wrapping the cigarette packs in an outer film or plastic blank. The finished cigarette packs are used to form pack groups which are provided with a multipack wrapper in the region of the multipacker and thus produce a cigarette multipack comprising usually ten cigarette packs. These cigarette multipacks are fed, by a multipack conveyor, to the cartoner which transfers finished shipping cartons, with a plurality of cigarette multipacks, to a removal conveyor. Each of these production units comprises one or more drives. Of these drives, one has the function of a central drive or master drive 11. The speeds or angles of rotation of all the other drives (dependent drives) are derived directly or indirectly from the speed of the master drive 11 or from the respective angle of rotation. If appropriate, account is taken in this case of predefined or predefinable laws of movement which describe mathematically, for example, an oscillating movement of a dependent drive synchronously to a rotation movement of the master drive 11 or the like.

The film-wrapping machine 10 is shown in a side view as a detail from the installation. The (concealed) master drive 11 is shown by broken lines. To protect the operating personnel, the film-wrapping machine 10 has a central hood 12 which can be opened via a handle 13. The central hood 12 conceals a unit 14 with its own drive, namely a dependent drive 20. The unit 14 is a cutter block. The unit is covered by a hood 15 provided within the central hood 12 (hood within a hood). The hood 15 is shown in the closed state, while the opened state is indicated by broken lines. The hood 15 can be opened only when the central hood 12 has first been opened. Finally, a handwheel 16 is shown which cannot be accessed or cannot be actuated when the central hood 12 is closed. The master drive 11 can be turned with the handwheel 16. The production unit comprises, if appropriate, further dependent drives (not shown in detail). Further dependent drives may form part of further production units, for example of the maker and/or of the packer.

Figure 2:
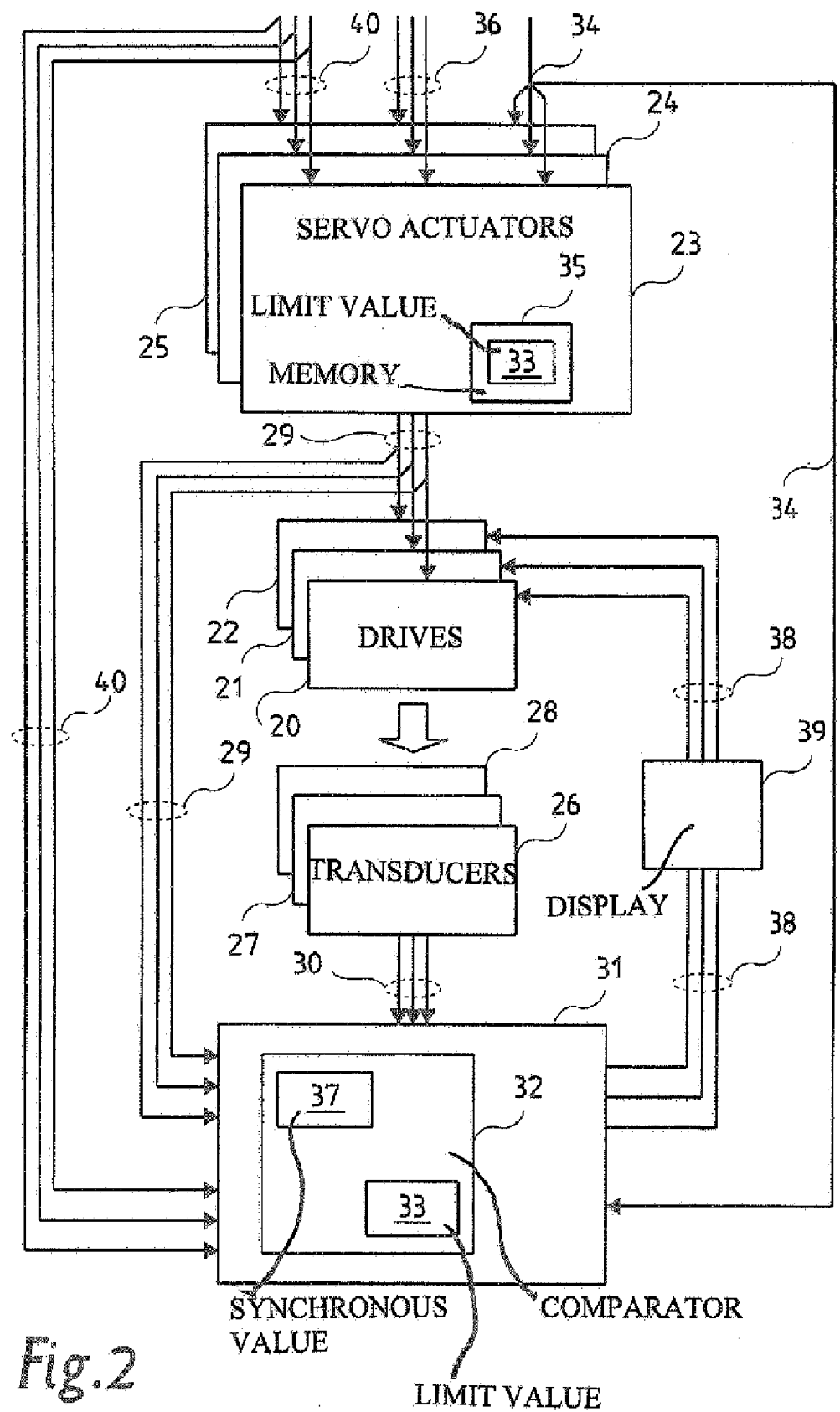
FIG. 2 shows a schematic representation of a chain of action for individual drives of the installation.

FIG. 2 shows a schematic representation of a chain of action for individual drives 20, 21, 22 of the installation. The drives 20-22 are dependent drives. They are referred to hereinafter simply as drives 20-22. Each drive 20-22 is assigned a servo actuator 23, 24, 25, hereinafter referred to in short as servo 23, 24, 25, and is also assigned, as transducer 26, 27, 28, a sensor for speed of rotation and/or angle of rotation. The or each servo 23-25 sets a desired value 29 for the respective drive 20-22, in particular in the form of a desired speed or a desired angle of rotation. The actual movement of each drive 20-23 is determined by the transducer 26-28 assigned in each case to the drive 20-23 and is transmitted as actual value 30, in particular as actual value of the instantaneous speed or as actual value of the instantaneous position, that is to say the angle of rotation, to a comparator 31. The comparator 31 is provided for comparing desired value 29 and actual value 30 for each drive.

Each servo 23-25 comprises at least one input at which it can receive a transmitted speed of rotation or angle of rotation of the master shaft, hereinafter referred to jointly as the master shaft default 34. From the master shaft default 34, the servo 23-25 derives a default speed or default position and transmits this as desired value 29 in the form of a default speed or default angle of rotation to the respective drive 20-23.

The desired value 29 is derived using not only the master shaft default 34 but also a limit value 33 which is either stored in a memory 35 of the respective servo 23-25 or is transmitted to this in the form of a limit value signal 36. The limit value 33 is taken into account by the servo 23-25 such that the desired value 29 never exceeds the limit value 33. The storage of the limit value 33 in the memory 35 or its transmission as limit value signal 36 can exist alternately or concurrently. Limit value 33 and limit value signal 36 are also referred to hereinafter as "safe value". In the variant in which the safe value is either only stored in the memory 35 as limit value 33 or is only transmitted as limit value signal 36, the respectively available safe value is used to derive the desired value 29. In the variant in which the safe value is both stored in the memory 35 and is also transmitted as limit value signal 36, it is conceivable that the limit value 33 stored in the memory 35 acts as an upper limit, so that the limit value signal 36 is used to derive the desired value 29 as long as the limit value signal 36 remains below the limit value 33, and that, with a limit value signal 36 above the limit value 33, the limit value 33 stored in the memory 35 is always used to derive the desired value 29. Of course, exactly the reverse scenario or similar variants are conceivable.

The master shaft default 34 is taken in a manner not shown in detail either from the master shaft itself or from the handwheel 16, specifically for example with a transducer coupled to the master shaft or to the handwheel 16, for example an incremental transducer. Taking speed information or position information from the handwheel 16 is provided for only in setup mode, because in normal operation the handwheel 16 is not accessible for actuation, since it is covered by the central hood 12. Moreover, taking information from the handwheel 16 is provided for exclusively when the handwheel 16 acts not directly but only indirectly on the master shaft, for example via an electronic transmission.

The desired value 29 derived from the master shaft default 34 is delivered not only to the respective drive 20-22 but also to the comparator 31. Each desired value 29 is stored as synchronous value 37 in the memory 32 of the comparator 31. During operation, the actual value 30 taken for each drive 20-22 can be compared with the respective synchronous value 37 by the comparator 31. If the actual value 30 of a drive 20-22 exceeds the respective synchronous value 37, a corresponding stop signal 38 is generated which switches off either all the drives 20-22 or the drive 20-22 which is no longer running synchronously, in particular also the master drive 11 too. In addition, or as an alternative, provision can be made for the stop signal 38 to be generated not only when the synchronous value 37 is exceeded, but for said stop signal 38 to be generated when the actual value 30 departs from a predefined or predefinable range about the synchronous value 37. It is then possible, for example, to also detect asynchronies caused by drives 20-22 erroneously running too slowly. In addition, the individual actual values 30 are also monitored in respect of the limit value 33, i.e. the limit value 33 forms an upper limit which must not be exceeded by the desired value 29 given a corresponding default. When the limit value 33 is exceeded, the stop signal 38 is therefore also triggered. The limit value 33 can be an upper limit common to all drives 20-22 or can be set individually for each drive. The limit value 33 is then a field of possibly respectively different individual speed limits or position tolerance ranges. The or each stop signal 38 is routed through a display device 39 which for example supplies information, about the drive 20-22 causing the error, via optical display elements (not shown), for example a screen, in particular with clear-text display, or control lights. Instead of the situation shown, each drive 20-22 can be provided with its own comparator. Each of these comparators then comprises its own memory in which at least the limit value 33 set for the respective drive 20-22 and the actual synchronous value 37 are stored. The stop signal 38 possibly generated by an individual comparator of this kind is either delivered individually to the respective drive 20-22 or delivered to all the drives 20-22, in particular also the master drive 11.

In the normal operation of the installation, that is to say during ongoing production, the synchrony of the individual drives 20-22 with one another and with the master drive 11 can be assured in this way. This is done by monitoring the synchronous value 37. Moreover, it is possible to ensure that none of the drives 20-22 exceeds a predefined or predefinable upper limit, for example an upper speed limit. This is done by monitoring the limit value 33.

When access is made into the installation, for example for maintenance or inspection purposes, that is to say in what is called a setup mode, monitoring of the movement of the individual drives 20-22 is likewise necessary. The setup mode differs from the normal operating mode in that the drives 20-22 run at much reduced speed. This is achieved by the fact that, in the setup mode, the speed of rotation of the master shaft is reduced. The speed of rotation of the master shaft can be predefined by the handwheel 16 or an otherwise suitable setting device, for example a modifiable resistance, that is to say a potentiometer or the like. When a handwheel 16 acting directly on the master shaft is used, the speed of the master shaft is limited on account of the limited physical power of the operator actuating the handwheel 16. When using a handwheel 16 coupled only indirectly to the master shaft, for example via an electronic transmission, or when using for example a potentiometer instead of the handwheel 16, the speed of the master shaft is limited by suitable monitoring of limit values. This is explained below with reference to FIG. 3.

Access into the installation is possible only when the central hood 12 is opened. In other words, at least a hood signal 40 is present from the central hood 12. With the hood signal 40, the limit value 33 is reduced. This can be done by virtue of the fact that, on the one hand, a limit value for the normal operating mode and, on the other hand, a limit value for the setup mode are stored as limit value 33 in the memory 32 of the comparator 31 and in the memory 35 of the respective servo 23-25, and the respective limit value 33 is chosen depending on the status of the hood signal 40. Alternatively, it is possible, for example, that the limit value 33 in the setup mode, that is to say when a hood signal 40 is present, is reduced in a defined manner, which can be easily done, for example, by a mathematical or logic operation (division or shift operation, respectively). Finally, it is also conceivable that the limit value signal 36 is reduced in a defined manner when the hood signal 40 is present. In the setup mode, the reduced speed of the master shaft thus also results in reduced desired values 29 for the drives 20-22. The desired values 29 are maintained through monitoring the synchronous value 37 by the comparator 31 in the same way as in the normal operating mode. Likewise, limiting the movement of the drives 20-22, that is to say safely avoiding a speed of rotation or a position outside the range defined by the limit value 33, is also ensured in the same way as in the normal operating mode.

Figure 3:
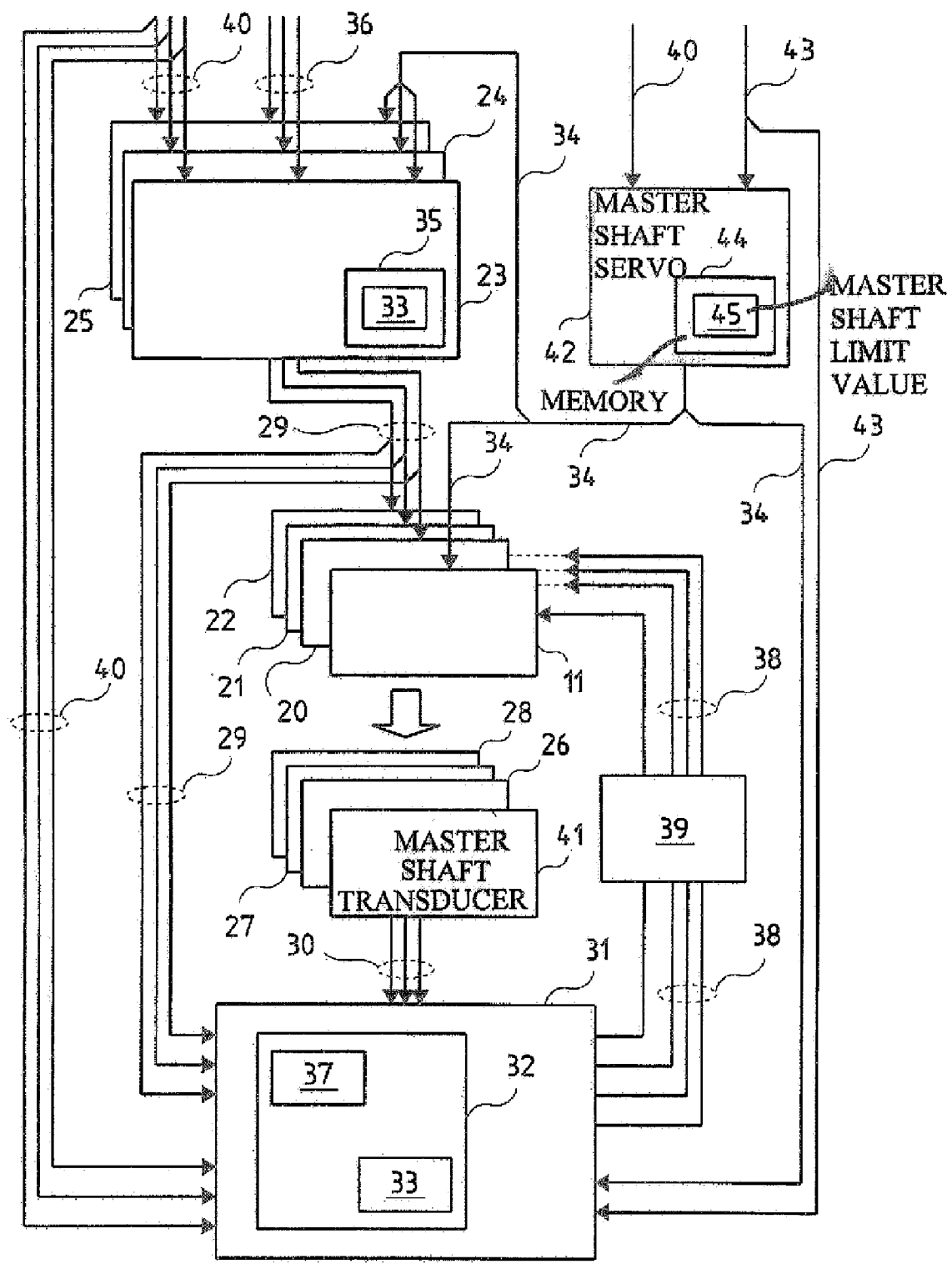
FIG. 3 shows a schematic representation of the chain of action with the master drive integrated into the chain of action.

To limit the speed of the master shaft, the master drive 11 itself is integrated in the chain of action according to FIG. 2. The conditions that arise are shown in FIG. 3. The master drive 11, in the same way as the dependent drives 20-22, is assigned its own transducer, namely the master shaft transducer 41. The speed of rotation or position of rotation of the master shaft is, like the speed of rotation or position of rotation of the dependent drives 20-22, detected as actual value 30 and delivered to the comparator 31. Upstream of the master drive 11 there is a master shaft servo 42 which provides the same function as the servos 23-25 of the dependent drives 20-22, i.e. a default, in particular a speed default, is determined from an input signal 43 and this default is conveyed onward as master shaft default 34 to the master drive 11. The input signal 43 is derived from the handwheel 16 or from an otherwise suitable setting device. The master shaft default 34 is at the same time input of the servos 23-25 of the dependent drives 20-22. On determination of the master shaft default 34, a master shaft limit value 45 stored in a memory 44 of the master shaft servo 42 is taken into account so that the master shaft default 34 never exceeds this master shaft limit value 45. In other words, upon calculation of the master shaft default 34, each value for the master shaft default 34 above or outside the master shaft limit value 45 is discarded and, instead, the master shaft limit value 45 itself is used. In the presence of the hood signal 40, the master shaft limit value 45 can be reduced exactly like the limit value 33 of the servos 23-25, so that, when access is made into the installation, the master shaft default 34 can be reduced immediately.

Through monitoring of the limit value 33 and of the synchronous value 37, the installation can be operated with a safely limited movement in respect of position and/or speed, specifically both in the normal operating mode and also in the setup mode. A safe stopping of the drives, in particular of the master drive 11 and of the dependent drives 20-22, is possible by delivering the master shaft default 34 or the input signal 43 of the master shaft to the comparator 31. FIG. 2 shows that the master shaft default 34 is delivered not only to the servos 23-25 but also to the comparator 31. In the comparator 31, the respective value of the master shaft default 34 has the effect that for a master shaft default 34 not equal to zero the instantaneous limit value 33 is used and for a master shaft default 34 equal to zero the limit value 33 itself is set to zero. In case of integration of the master drive 11 in the chain of action, as is shown in FIG. 3, the master shaft default 34 is also delivered to the comparator 31 and in a particularly preferred embodiment also the input signal 43. In this arrangement, the limit value 33 is set to zero if either the master shaft default 34 or the input signal 43 is equal to zero. This also takes account of any errors in the determination of the master shaft default 34 in the master shaft servo 42 from the input signal 43. With a limit value 33 equal to zero, starting up of each drive, that is to say of the dependent drives 20-22 or of the dependent drives 20-22 including the master drive 11, is safely avoided, because the comparator 31 switches off the respective drive or all drives immediately by means of a corresponding stop signal 38 upon each movement of a drive and when there is thus an actual value 30 different than zero for this drive.

In a preferred embodiment, the or each transducer 26-28, in particular also the master shaft transducer 41, can be designed as a combined movement transducer and torque transducer or as a combination of a separate transducer for recording movement information, i.e. position and/or speed, and a separate torque transducer. Correspondingly, at least the limit value 33 then comprises on the one hand a limit value related to speed of rotation or position and on the other hand a limit value relating to torque. In this way it is also possible to avoid damage to the installation when the drives, in particular also the master shaft, are blocked.

An advantage of the invention lies in the fact that it is possible to cut down on the safety mechanisms hitherto required for the dependent drives, that is to say the hoods or the like. On the other hand, an advantage of the invention is also the fact that, in the case where safety mechanisms are still present on individual dependent drives, a speed reduction adapted to signals from these safety mechanisms is possible, for example such that, with the central hood 12 opened, the speed of the central drive is reduced by 90% for example and, with additional opening of a specific further hood, there is a further speed reduction of a further 50% for example, and when another hood is opened, by contrast, a further speed reduction of, for example, 30% and so on. Such combinations and links can be easily stored in the comparator 31 and/or in the servo 23-25, if appropriate also in the master shaft servo 42.

In summary, the invention can be described as follows: A method and a device are made available for controlling a production unit in a production installation, controlling referring to the controlling and monitoring of speeds of rotation or angles of rotation of individual drives 20-22 such that the movements of these are monitored in respect of a synchronous value 37 and/or a limit value 33 according to position and/or speed. The monitoring in respect of the limit value 33 results in a safely limited movement of the individual drives. The monitoring in respect of the synchronous value 37 permits detection of asynchronies. The monitoring can be carried out in normal operating mode and/or in setup mode, and, in setup mode, it serves particularly to protect the operating personnel from drives 20-22 that start up suddenly or are running too fast.

LIST OF REFERENCE NUMBERS 10 film-wrapping machine
11 central drive
12 central hood
13 handle
14 unit
15 hood
16 handwheel
17 —
18 —
19 —
20 drive
21 drive
22 drive
23 servo actuator (servo)
24 servo actuator (servo)
25 servo actuator (servo)
26 transducer
27 transducer
28 transducer
29 desired value
30 actual value
31 comparator
32 memory
33 limit value
34 master shaft default
35 memory
36 limit value signal
37 synchronous value
38 stop signal
39 display device
40 hood signal
41 master shaft transducer
42 master shaft servo
43 input signal
44 memory
45 master shaft limit value

The invention claimed is:

1. A method for controlling a production unit of a production installation for the production and/or packaging of cigarettes or other articles for smoking with at least one master drive (11), and at least one dependent drive (20-22) whose movement depends directly or indirectly on the movement of a master shaft of the master drive (11), characterized in that the dependent drive (20-22) is in each case assigned a servo actuator (23-25),
in that the servo actuator (23-25) determines, from an input signal, a desired value (29) for the dependent drive (20-22) and conveys this desired value (29) to the dependent drive (20-22),
in that, when determining the desired value (29), account is taken of a limit value (33) stored in the servo actuator (23-25), and
in that this limit value or, if appropriate, a corresponding limit value that is taken into account for the determination of a desired value for the master drive, is reduced in the event of access being made into the production installation when a protective arrangement of the production unit is opened.

2. The method as claimed in claim 1, characterized in that the input signal of the servo actuator (23-25) is information with regard to a speed of rotation or an angle of rotation of the master shaft (34).

3. A method for controlling a production unit of a production installation for the production and/or packaging of cigarettes or other articles for smoking with at least one master drive (11), and at least one dependent drive (20-22) whose movement depends directly or indirectly on movement of a master shaft of the master drive (11), characterized in that the dependent drive (20-22) is in each case assigned a transducer (26-28), in that a movement of the dependent drive (20-22) is detected by the transducer (26-28) and is transmitted as an actual value (30) to a comparator (31), and in that the comparator (31) compares the actual value (30) with a limit value (33) stored in the servo actuator (23-25) and, in the event of a deviation, generates a stop signal (38).

4. The method as claimed in claim 3, characterized in that the desired value (30) is stored in a memory (32) of the comparator (31) as a synchronous value (37), and in that the comparison with the actual value (30) relates to the stored synchronous value (37).

5. The method as claimed in claim 3, characterized in that each dependent drive (20-22) has its own synchronous value (37) and/or its own limit value (33) stored in the comparator (31).

6. The method as claimed in claim 3, characterized in that the master drive (11) is assigned its own servo actuator, master shaft servo (42), and its own transducer, master shaft transducer (41), in that, from an input signal (43) of the master shaft servo (42), a master shaft default for the master drive (11) is determined and is delivered to the comparator (31) for the master drive (11), and in that the comparator (31) compares an actual value (30), detected by the master shaft transducer (41), with a limit value (33) stored in the servo actuator (23-25) and/or with the master shaft default and, in the event of a deviation, generates a stop signal (38).

7. The method as claimed in claim 6, characterized in that, when determining the master shaft default, account is taken of a limit value (33) stored in the master shaft servo (42).

8. The method as claimed in claim 6, characterized in that the master shaft default (34) is delivered to an input of the servo actuator (23-25) of the dependent drive (20-22).

9. The method as claimed in claim 6, characterized in that a hood signal (40) is delivered to the servo actuator (23-25) and if appropriate also to the master shaft servo (42) and/or to the comparator (31), which hood signal (40) is triggered when access is made into the production installation, and in that, in the presence of a hood signal (40), the limit value (33) in the servo actuator (23-25) and/or in the comparator (31), if appropriate also a master shaft limit value (45) in the master shaft servo (42), is reduced.

10. The method as claimed in claim 6, characterized in that the input signal or master shaft default of the servo actuator (23-25) is delivered to the comparator (31), and in that the limit value (33) is set to or kept at zero as long as the input signal or master shaft default (34) has a zero value.

11. A method for controlling a production unit of a production installation for the production and/or packaging of cigarettes or other articles for smoking with at least one master drive (11), and at least one dependent drive (20-22) whose movement depends directly or indirectly on movement of a master shaft of the master drive (11), characterized in that the dependent drive (20-22) is in each case assigned a servo actuator (23-25) and a transducer (26-28), in that the servo actuator (23-25) determines, from an input signal, a desired value (29) for the dependent drive (20-22) and conveys this desired value (29) to the dependent drive (20-22) and to a comparator (31), in that a movement of the dependent drive is detected by the transducer (26-28) and is transmitted as an actual value (30) to the comparator (31), and in that the comparator (31) compares the desired value (29) with the actual value (30) and, in the event of a deviation, generates a stop signal (38).

12. A device for controlling a production unit of a production installation for the production and/or packaging of cigarettes or other articles for smoking with at least one master drive (11), and at least one dependent drive (20-22) whose movement depends directly or indirectly on a movement of a master shaft of the master drive (11), characterized in that the dependent drive (20-22) is in each case assigned a servo actuator (23-25), in that the servo actuator (23-25) can determine, from an input signal, a desired value (29) for the dependent drive (20-22) and can deliver this desired value (29) to the dependent drive (20-22), in that the desired value (29) is limited by a limit value (33) stored in the servo actuator (23-25), and in that this limit value or, if appropriate, a corresponding limit value, which is taken into account for the determination of a desired value for the master drive, is reduced in the event of access being made into the production installation when a protective arrangement of the production unit is opened.

13. The device as claimed in claim 12, characterized in that the input signal is information with regard to a speed of rotation or an angle of rotation of the master shaft (34).

14. A device for controlling a production unit of a production installation for the production and/or packaging of cigarettes or other articles for smoking with at least one master drive (11), and at least one dependent drive (20-22), whose movement depends directly or indirectly on a movement of a master shaft of the master drive (11), characterized in that the dependent drive (20-22) is in each case assigned a transducer (26-28), in that a movement of the dependent drive (20-22) can be detected by the transducer (26-28) and can be transmitted as an actual value (30) to a comparator (31), and in that the comparator (31) is provided for comparing the actual value (30) with a limit value (33) stored in the servo actuator (23-25) and for generating a stop signal (38) in the event of a deviation.

15. The device as claimed in claim 14, characterized in that the actual value (30) can be stored in a memory (32) of the comparator (31) as a synchronous value (37), and in that the comparison with the actual value relates to the stored synchronous value (37).

16. The device as claimed in claim 15, characterized in that each dependent drive (20-22) can have its own synchronous value (37) and/or its own limit value (33) stored in the comparator (31).

17. The device as claimed in claim 14, characterized in that the master drive (11) is assigned its own master shaft servo (42) and its own master shaft transducer (41), in that, from an input signal (43) of the master shaft servo (42), a master shaft default, for the master drive (11) can be determined and can be delivered to the comparator (31) for the master drive (11), and in that the comparator (31) is provided for comparing an actual value (30) of the master drive (11), detectable by the master shaft transducer (41), with a limit value (33) which can be stored in the servo actuator (23-25) and/or with the master shaft default and for generating a stop signal (38) in the event of a deviation.

18. The device as claimed in claim 17, characterized in that the master shaft default is limited by a limit value (33) stored in the master shaft servo (42).

19. The device as claimed in claim 17, characterized in that the master shaft default can be delivered to an input of the servo actuator (23-25) of the dependent drive (20-22).

20. The device as claimed in claim 17, characterized in that a hood signal (40) can be delivered to the servo actuator (23-25) and if appropriate also to the master shaft servo (42) and/or to the comparator (31), which hood signal (40) can be triggered when access is made into the production installation, and in that, as a function of a status of the hood signal (40), the limit value (33) in the servo actuator (23-25) and/or in the comparator (31), if appropriate also a master shaft limit value (45) in the master shaft servo (42), can be reduced.

21. A device for controlling a production unit of a production installation for the production and/or packaging of cigarettes or other articles for smoking with at least one master drive (11), and at least one dependent drive (20-22), whose movement depends directly or indirectly on a movement of a master shaft of the master drive (11), characterized in that the dependent drive (20-22) is in each case assigned a servo actuator (23-25) and a transducer (26-28), in that the servo actuator (23-25) can determine, from an input signal, a desired value (29) for the dependent drive (20-22) and can deliver this desired value (29) to the dependent drive (20-22) and to a comparator (31), in that a movement of the dependent drive (20-22) can be detected by the transducer (26-28) and can be transmitted as actual value (30) to the comparator (31), and in that the comparator (31) is provided for comparing the actual value (30) with the desired value (29) and for generating a stop signal (38) in the event of a deviation.

* * * * *